United States Patent Office 3,489,749
Patented Jan. 13, 1970

3,489,749
ALKYL-SUBSTITUTED PHENOTHIAZINES
Donald Richard Randell, Stockport, England, assignor to Geigy Chemical Corporation, Ardsley, N.Y., a corporation of New York
No Drawing. Filed Apr. 26, 1967, Ser. No. 633,687
Claims priority, application Great Britain, May 6, 1966, 20,014/66
Int. Cl. C07d 93/14; C08f 45/60; C10m 1/32
U.S. Cl. 260—243                                5 Claims

ABSTRACT OF THE DISCLOSURE

Alkyl-substituted phenothiazines which bear in 1-position at the phenothiazine nucleus a t-butyl group and in 3- and 7-position of said nucleus the same or different alkyl groups of from 1 to 9 carbon atoms and which are useful as antioxidants; a process for producing these tri-alkylated phenothiazines from phenothiazine, 3-alkyl-phenothiazines or 3,7-dialkyl-phenothiazines by reaction with an excess of isobutylene in the presence of a Bronsted acid catalyst; a method of protecting organic material susceptible to oxidative deterioration with the aid of a novel tri-alkylated phenothiazine; and compositions containing such oxidation-susceptible organic material and an antioxidant amount of a novel tri-alkylated phenothiazine.

Field of the invention

The present invention relates to alkyl-substituted pheno- thiazines, a process for producing the same, and to chemical compositions containing these compounds.

Background of the invention

I have found previously by reacting phenothiazine with an olefine in the presence of a Bronsted acid catalyst, that an alkylated phenothiazine may be produced. However, such process has only been used by me for the production of mono- and/or di-alkyl phenothiazine derivatives. Thus, for example when I reacted di-isobutylene in large excess with phenothiazine in the presence of a Bronsted acid catalyst no more than two tertiary octyl groups could be introduced into the phenothiazine molecule, even when using severe reaction conditions of temperature and pressure.

However, I have now surprisingly found that by reacting phenothiazine or a mono or di-alkyl derivative thereof with an excess amount of isobutylene, a 1-t-butyl-3:7-dialkyl phenothiazine can be produced.

SUMMARY OF THE INVENTION

According to a first aspect of the present invention, there is provided a 1-t-butyl-3:7-dialkyl phenothiazine having the formula

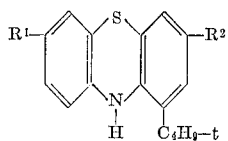

(I)

wherein $R^1$ and $R^2$ are the same or different and each is an alkyl radical containing from one to nine carbon atoms.

According to a second aspect of the present invention, there is provided a process of producing the 1-t-butyl-3:7-dialkyl phenothiazine compounds of Formula I which comprises contacting a phenothiazine compound having the formula

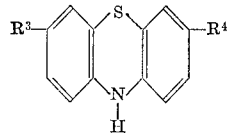

(II)

wherein $R^3$ and $R^4$ are the same or different and each is hydrogen or an alkyl radical containing from one to nine carbon atoms, with isobutylene in the presence of a Bronsted acid catalyst, the proportion of isobutylene being in excess of the stoichiometric equivalent of the phenothiazine compound of Formula II.

According to a third aspect, the present invention provides a composition comprising an organic substance susceptible to oxidative deterioration and, as antioxidant, a minor proportion of a compound of Formula I.

DETAILED DESCRIPTION OF THE INVENTION AND PREFERRED EMBODIMENTS THEREOF

In the novel tri-alkylated phenothiazines of Formula I, the radicals $R^1$ and $R^2$ may be normal, iso- or tertiary-alkyl groups, for example methyl, ethyl, n-propyl, n-butyl, n-pentyl, n-hexyl, n-heptyl, n-octyl, n-nonyl, iso-propyl, iso-butyl, iso-pentyl, tertiary-butyl, tertiary-pentyl, tertiary-hexyl, tertiary-octyl or tertiary-nonyl groups. Preferably, however, $R^1$ and $R^2$ are each a tertiary alkyl radical having from four to eight carbon atoms.

If phenothiazine itself is employed as a starting-material in the process of the present invention, it is preferred to use a grade of phenothiazine which is substantially devoid of free sulphur and is of very low iodine content. Particularly, it is preferred to use substantially pure phenothiazine.

If an alkyl-substituted phenothiazine compound is employed as a starting-material in the process of the invention, the alkyl-phenothiazine compound may be mono- or di-alkyl substituted. Examples of alkyl-phenothiazine compounds of Formula II which are suitable for use in the process of the present invention include 3-methyl-phenothiazine, 3-ethyl-phenothiazine, 3-isopropyl-phenothiazine, 3-tertiarybutyl-phenothiazine, 3-n-pentyl-phenothiazine, 3-n-hexyl-phenothiazine, 3-n-heptyl-phenothiazine, 3-tertiary-octyl-phenothiazine, 3-n-nonyl-phenothiazine, 3:7-dimethyl-phenothiazine, 3:7-diethyl-phenothiazine, 3:7-diisopropyl-phenothiazine, 3:7-di - tertiarybutyl - phenothiazine and 3:7-di-tertiaryoctyl-phenothiazine.

The proportion of isobutylene starting material to that of the compound of Formula II which which is present under the conditions of the process of the invention is in excess of the stoichiometric equivalent of the phenothiazine compound of Formula II in order to produce the 1-t-butyl-3:7-dialkyl phenothiazine compound of Formula I. The phenothiazine compound of Formula II is preferably contacted with the gaseous isobutylene until no further uptake of the olefine reactant occurs.

The Bronsted acid which is employed as a catalyst for the process of the present invention may be, for instance, sulphuric acid, phosphoric acid, an organic sulphonic acid, a dialkyl sulphate or a mixture of two or more thereof. Alternatively, a boron trifluoride complex compound may be employed as a catalyst, for instance boron trifluoride complex compounds with water, ethanol, ethylene glycol, diethyl ether, tetrahydrofuran or dioxane.

If sulphuric acid is present as a catalyst, it may be, for example, in the form of concentrated sulphuric acid, oleum or an aqueous solution of the acid, but is preferably sulphuric acid monohydrate, namely an equimolar mixture of concentrated sulphuric acid ($H_2SO_4$) and water. If phosphoric acid is present as catalyst, it may be, for example, in the form of orthophosphoric acid or an aqueous solution of the ortho-phosphoric acid, for instance a substantially equimolar mixture of ortho-phosphoric acid ($H_3PO_4$) and water.

The organic sulphonic acid which may be present as catalyst is preferably an aliphatic, an alicyclic or an aromatic sulphonic acid. If the organic sulphonic acid is an aliphatic sulphonic acid it may be, for instance, methane- or ethane-sulphonic acid. If the organic sulphonic acid is an alicyclic sulphonic acid it may be, for example, camphor sulphonic acid. If the organic sulphonic acid is an aromatic sulphonic acid, it may contain more than one sulphonic acid group. Examples of preferred aromatic sulphonic acids include benzene sulphonic acid, p-toluene sulphonic acid, naphthalene - 1:5 - disulphonic acid, naphthalene - 2:7 - disulphonic acid and naphthalene - 1:8 - disulphonic acid. The organic sulphonic acid which may be used in the process of the invention may be in the form of the substantially anhydrous compound or, if desired, may be the corresponding monohydrate, for example, p-toluene sulphonic acid monohydrate.

When phenothiazine is employed as a starting-material in the process of the invention, the use of an organic sulphonic acid as catalyst in the process of the present invention is advantageous in that an impure grade of phenothiazine may then be used. For example, if an organic sulphonic acid is used as catalyst in the process of the invention, an impure grade of phenothiazine containing substantial amounts of sulphur and iodine may be employed.

The alkyl groups of the dialkyl sulphate catalyst which may be used in the process of the present invention preferably contain from one to four carbon atoms each. Examples of preferred dialkyl sulphate catalysts include dimethyl sulphate, diethyl sulphate, di-n-propyl sulphate, di-isopropyl sulphate and di-n-butyl sulphate.

The proportion of Bronsted acid catalyst which is employed in the process of the present invention is conveniently within the range of from 0.01 to 1.5 moles of the catalyst per mole of the phenothiazine compound of Formula II, a proportion within the range of from 0.1 to 0.5 moles of catalyst per mole of the phenothiazine compound of Formula II being particularly preferred.

The process of the present invention is advantageously carried out in the presence of a solvent which is substantially inert under the conditions of the reaction. Examples of inert solvents which may be used include mineral oil, n-heptane, iso-octane, petroleum ether and tetrachloroethane. The process may, if desired, be carried out in an inert atmosphere, for example in nitrogen.

The process for the invention is preferably carried out at substantially atmospheric pressure but may be, if desired, effected at an elevated pressure. The process is preferably effected at a temperature within the range of from 50° to 200° C., a temperature within the range of from 80° to 150° C. being particularly preferred.

The 1 - t - butyl - 3:7 - dialkyl phenothiazine of Formula I product of the process of the invention may be recovered from the reaction mixture by any conventional method, for instance fractional crystallization from a suitable solvent.

In the compositions stabilized against oxidation in accordance with the third aspect of the invention, organic substances which are susceptible to oxidative deterioration may be for instance lubricants or other functional fluids based on mineral oil or synthetic material, polymeric resins such as polyvinyl chloride or polyolefines, especially polyethylene and polypropylene, and other natural and synthetic materials susceptible to oxidation.

If the oxidisable material is a lubricant, it is preferably a lubricant based on one or more organic carboxylic acid esters, intended for use at or above 400° F. Examples of such synthetic lubricants include lubricants based on a diester of one or more dibasic acids and a monohydric alcohol, for instance dioctyl sebacate or dinonyl adipate; on a triester of one or more monocarboxylic acids and a trihydric alcohol, for example trimethylol propane tripelargonate, trimethylol ethane tripelargonate or trimethylol ethane tricaprylate; on a tetraester of one or more monobasic acids and a tetrahydric alcohol, for instance pentaerythritol tetracaprylate; or on complex esters derived from one or more monobasic acids, dibasic acids and polyhydric alcohols, for instance a complex ester derived from trimethylol propane, caprylic acid and sebacic acid; or on mixtures thereof.

It is preferred that the composition of this invention contains a proportion of the antioxidant of Formula I within the range of from 0.001% to 5% by weight, more preferably within the range of from 0.01% to 1% by weight, based on the total weight of the composition.

The compositions of the present invention may, is desired, also contain other constituents, for instance one or more load-carrying additives, viscosity index improvers or pour-point depressants of conventional type for synthetic lubricants. In addition one or more metal deactivators may be present if desired, for example benzotriazole or a copper-protecting derivative of benzotriazole, preferably in a proportion within the range of from 0.01% to 1% by weight based on the total weight of the composition.

The following examples further illustrate the present invention. Parts and percentages are expressed by weight unless otherwise stated. Parts by weight bear the same relation to parts by volume as do kilograms to litres.

EXAMPLE 1

400 parts of phenothiazine were suspended to 624 parts of mineral oil and 76 parts of p-toluene sulphonic acid monohydrate were added to the suspension. The reaction mixture was heated to 100° C. and isobutylene gas was passed into the mixture for seven hours after which time no further absorption of gas occurred. The increase in weight of the reaction mixture (336 parts) (45.6%) corresponded to the uptake of three molecules of isobutylene.

The reaction mixture was then washed with aqueous sodium hydroxide and subsequently with water to neutrality. On standing, 200 parts of a greenish-white solid separated from the reaction mixture. The solid, after two recrystallisations from petroleum ether (boiling point 60° to 80° C.) yielded 1:3:7-tri-tertiarybutylphenothiazine having melting-point 164° to 164.5° C. and the following elemental analysis:

Calc'd—$C_{24}H_{33}NS$ requires (percent), C, 77.43; H, 9.05; N, 3.81; S, 8.71. Found: C, 77.57; H, 9.20; N, 3.86; S, 8.83.

When the procedure described in Example 1 was repeated but using each of ethylene, propylene, 2-methylbutene-1, 2-methylpentene-1 (proplyene dimer) and di-isobutylene instead of isobutylene, only a mixture of mono- and di-tertiary-alkyl phenothiazine was obtained, no isolable 1:3:7-tri-tertiary-alkyl-phenothiazine being produced.

EXAMPLE 2

The procedure described in Example 1 was repeated except that the mineral oil solvent was replaced by petroleum ether (boiling point 100° to 120° C.). The uptake of isobutylene was complete after 8 hours.

In this way, 360 parts of 1:3:7-tri-tertiarybutyl phenothiazine were obtained (representing a yield of 48.8% of the theoretical) having melting-point of 165° C. without further recrystallisation.

EXAMPLE 3

42.3 parts of 3:7-di-tertiary-octyl-phenothiazine were suspended in 100 parts of petroleum ether (boiling range 100° to 120° C.) and 0.76 part of p-toluene sulphonic acid monohydrate were added to the suspension. The mixture was heated to the reflux temperature and isobutylene gas was bubbled through the liquid mixture for 32 hours, after which time no further increase in weight of the reaction mixture was observed. The increase in weight of the mixture (5.6 parts) corresponded to the uptake of one molecule of isobutylene per molecule of di-tertiary-octyl-phenothiazine. Thin-layer chromatographical examination of the reaction mixture showed the presence of a large proportion of 1-t-butyl-3:7-di-tertiary-octyl-phenothiazine.

The reaction mixture was neutralised with aqueous sodium hydroxide, washed with water and dried over anhydrous sodium sulphate; the solvent was then removed by distillation leaveing a viscous green oil consisting predominantly of 1-t-butyl-3:7-di-t-octyl phenothiazine and having the following sulphur analysis by weight: Calculated (for $C_{32}H_{49}NS$) 6.67%. Found: 6.51%.

EXAMPLE 4

4.5 parts of 3:7-dimethyl phenothiazine were suspended in 100 parts by volume of petroleum ether (boiling range 100° to 120° C.) and 0.76 part of p-toluene sulphonic acid monohydrate were added to this suspension. The reaction and recovery procedure was otherwise essentially the same as that described in Example 3.

In this way, 1-t-butyl-3:7-dimethyl phenothiazine was obtained as a green resin and was identified by thin-layer chromatography.

EXAMPLE 5

A mixture of 400 parts of phenothiazine, 76 parts of p-toluene sulphonic acid monohydrate and 650 parts of a mineral oil was heated at 130° C. for 3 hours and then at 100° to 110° C. for a further 9 hours, iso-butylene being passed through the reaction mixture until absorption ceased. Thin-layer chromatographical examination of a sample taken from the reaction mixture at the end of 12 hours heating showed that only one component was present in the mixture. Consequently, the reaction was then stopped.

The reaction mixture was washed at 100° C. with 10% sodium hydroxide solution and then with water at the same temperature until the mixture was neutral. The product was an oil which partially crystallised on being allowed to stand. The product was triturated with methylated spirit and the solid material filtered off. The solid material was then recrystallised from a mixture of 75% petroleum ether (boiling point 60° to 80° C.) and 25% absolute ethanol. In this way, 335 parts of 1:3:7-tri-t-butyl phenothiazine were obtained, representing a yield of 45.5% theoretical.

EXAMPLE 6

A synthetic ester-based lubricant composition was produced and subjected to the Pratt and Whitney Type II oxidation-corrosition test. The base fluid was pentaerythritol tetracaprylate and each test was carried out for 48 hours at 425° F. using dry air at the rate of 5 litres per hour and in the presence of specimens of magnesium alloy, aluminium alloy, copper, silver and steel. 3.0% by weight of benzotriazole were added to the lubricant composition.

The results of the test are shown in Table I which includes comparative data obtained when no additive was present and also when a conventional additive was present. In the table, the acid value increase is expressed as milligrams of potassium hydroxide per gram; the sludge is expressed in milligrams; and the weight change of the specimens as milligrams per square centimetre.

TABLE I

| Additive | Weight, percent | Percent viscosity increase at 100° F. | Acid value increase | Sludge | Weight change of specimens |||||
|---|---|---|---|---|---|---|---|---|---|
| | | | | | Mg alloy | Al alloy | Cu | Ag | Steel |
| None | | 246.2 | 11.5 | 21 | −19.8 | −10.03 | +0.65 | +0.03 | +0.03 |
| Diphenylamine | 2.0 | 35.4 | 3.8 | 80 | −4.75 | Nil | −0.69 | +0.01 | Nil |
| Phenothiazine | 2.0 | 30.2 | 5.8 | 377 | +0.14 | +0.07 | −0.22 | +0.18 | +0.08 |
| 1:3:7-tri-tertiarybutyl-phenothiazine | 3.0 } | 41.5 | 6.8 | 13 | −1.02 | −0.01 | −0.56 | −0.06 | −0.04 |
| Plus benzotriazole | 0.5 } | | | | | | | | |

EXAMPLE 7

A mixture of 20 parts by weight of freshly distilled oenanthol (n-heptaldehyde) and 0.001 part by weight of the additive mentioned below was placed in a shaking vessel. The shaking vessel was connected to a gas burette and the mixture was contacted with atmospheric oxygen at room temperature (25° C.). The time required for the absorption of 50 parts by volume of oxygen was determined. The results are shown in Table II. For the purpose of comparison, the result is shown of a similar test but using no additive.

TABLE II

| Additive: | Oxygen uptake time, minutes |
|---|---|
| None (control) | 10 |
| 1:3:7-tri-tertiarybutylphenothiazine | 300 |

What I claim is:

1. A 1-t-butyl-3:7-dialkyl phenothiazine having the formula:

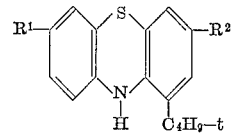

wherein $R^1$ and $R^2$ are the same or different and each is an alkyl radical containing from 1 to 9 carbon atoms.

2. A 1-t-butyl-3:7-dialkyl phenothiazine as claimed in claim 1 wherein $R^1$ and $R^2$ are ethyl, n-propyl, n-butyl, n-pentyl, n-hexyl, n-heptyl, n-octyl, n-nonyl, iso-propyl, iso-butyl, iso-pentyl, tertiary pentyl, tertiary hexyl or tertiary nonyl groups.

3. 1:3:7-tri-(tertiary butyl)-phenothiazine.
4. 1-t-butyl-3:7:1-di-(tertiary octyl)-phenothiazine.
5. 1-t-butyl-3:7-dimethyl-phenothiazine.

References Cited

FOREIGN PATENTS 889,341 1962 England.
1,036,696 7/1966 England.

OTHER REFERENCES

Olah, Friedel-Crafts and Related Reactions, vol. 1, pp. 315-328 (1963).

HENRY R. JILES, Primary Examiner

HARRY I. MOATZ, Assistant Examiner

U.S. Cl. X.R.

252—405; 260—45.8

UNITED STATES PATENT OFFICE
CERTIFICATE OF CORRECTION

Patent No. 3,489,749        Dated January 13, 1970

Inventor(s) Donald Richard Randell

It is certified that error appears in the above-identified patent and that said Letters Patent are hereby corrected as shown below:

In column 6, line 57, "1-t-butyl-3:7:1-di-(tertiary octyl)-phenothiazine" should read --1-t-butyl-3:7-di-(tertiary octyl)-phenothiazine--.

SIGNED AND SEALED
JUL 7 1970

(SEAL)
Attest:

Edward M. Fletcher, Jr.
Attesting Officer

WILLIAM E. SCHUYLER, JR.
Commissioner of Patents